(12) United States Patent
Modarresi (10) Patent No.: US 10,152,545 B2
(45) Date of Patent: Dec. 11, 2018

(54) PERSONALIZED RECOMMENDATIONS USING LOCALIZED REGULARIZATION

(71) Applicant: Adobe Systems Incorporated, San Jose, CA (US)

(72) Inventor: Kourosh Modarresi, Los Altos, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 364 days.

(21) Appl. No.: 14/918,261

(22) Filed: Oct. 20, 2015

(65) Prior Publication Data

US 2017/0109444 A1    Apr. 20, 2017

(51) Int. Cl.
G06F 17/30 (2006.01)
G06F 3/0484 (2013.01)

(52) U.S. Cl.
CPC ...... *G06F 17/30867* (2013.01); *G06F 3/0484* (2013.01); *G06F 17/3053* (2013.01)

(58) Field of Classification Search
None
See application file for complete search history.

(56) References Cited

U.S. PATENT DOCUMENTS

| | | | | |
|---|---|---|---|---|
| 9,760,802 | B2* | 9/2017 | Chen | G06K 9/6226 |
| 2006/0004713 | A1* | 1/2006 | Korte | G06F 17/30867 |
| 2006/0282856 | A1* | 12/2006 | Errico | G06F 17/30035 |
| | | | | 725/46 |
| 2009/0132520 | A1* | 5/2009 | Nemeth | G06F 17/30038 |
| 2009/0210246 | A1* | 8/2009 | Patel | G06Q 30/02 |
| | | | | 705/319 |
| 2009/0319338 | A1* | 12/2009 | Parks | G06Q 10/0639 |
| | | | | 705/7.38 |
| 2010/0268661 | A1* | 10/2010 | Levy | G06Q 30/02 |
| | | | | 705/347 |
| 2011/0179081 | A1* | 7/2011 | Ovsjanikov | G06F 17/30867 |
| | | | | 707/780 |

(Continued)

OTHER PUBLICATIONS

Adomavicius,"Toward the Next Generation of Recommender Systems: A Survey of the State-of-the-Art and Possible Extensions", IEEE Transactions on Knowledge and Data Engineering, vol. 17, No. 6, Jun. 2005, Jun. 6, 2005, pp. 734-749.
Anderson,"The Long Tail: Why the Future of Business Is Selling Less of More", Hyperion Books, New York, 2006., 2006, 3 pages.
Backstrom,"Supervised Random Walks: Predicting and Recommending Links in Social Networks", ACM International Conference on Web Search and Data Mining (WSDM), 2011, 10 pages.

(Continued)

*Primary Examiner* — Hung D Le
(74) *Attorney, Agent, or Firm* — Wolfe-SBMC (57) ABSTRACT

A subset of items that can be identified, promoted, or recommended to the user is determined based in part on rankings or other feedback that the user has given to other items in the set. The techniques discussed herein employ localized regularization to generate estimated values for the unknown values. Regularization refers to adding information into the system in order to generate the unknown values. This additional information of the system is an estimate, and is generated based on the known properties of the system. The techniques discussed herein employ localized regularization, which refers to estimating additional information based on the particular user for which the unknown values are being generated. In contrast to employing global regularization that treats all users in the system the same, the localized regularization discussed herein treats each user independently of the other users.

20 Claims, 6 Drawing Sheets

(56) References Cited

U.S. PATENT DOCUMENTS

| | | | | |
|---|---|---|---|---|
| 2011/0302117 | A1* | 12/2011 | Pinckney | G06Q 30/02 706/12 |
| 2011/0307478 | A1* | 12/2011 | Pinckney | G06N 99/005 707/724 |
| 2013/0124449 | A1* | 5/2013 | Pinckney | G06F 17/30867 706/52 |
| 2013/0339345 | A1* | 12/2013 | Soto Matamala | H04W 4/21 707/722 |
| 2014/0025609 | A1* | 1/2014 | Coster | G06Q 30/0631 706/12 |
| 2014/0188956 | A1* | 7/2014 | Subba | G06F 9/453 707/829 |
| 2015/0039644 | A1* | 2/2015 | Trivedi | H04L 67/22 707/767 |
| 2016/0078489 | A1* | 3/2016 | Hu | G06Q 30/0269 705/14.66 |
| 2016/0125501 | A1* | 5/2016 | Nemery | G06Q 30/0631 705/26.7 |
| 2016/0188725 | A1* | 6/2016 | Wang | G06F 17/30867 707/734 |
| 2016/0316268 | A1* | 10/2016 | Carmichael | H04N 21/4662 |

OTHER PUBLICATIONS

Becker,"NESTA: A Fast and Accurate First-Order Method for Sparse Recovery", SIAM Journal on Imaging Sciences, 2009, 37 pages.

Hastie,"BOOK—The Elements of Statistical Learning: Data Mining, Inference, and Prediction", Springer-Verlag, ISBN: 0387848576, 2009, 758 pages.

Jolliffe,"Principal Component Analysis", New York: Springer Verlag, 1986., 1986, 519 pages.

Koren,"The BellKor Solution to the Netflix Grand Prize", Report from the Netflix Prize Winners, 2009, 10 pages.

Maida,"Explaining MCDM acceptance: a conceptual model of influencing factors", Proceedings of the Federated Conference on Computer Science and Information Systems, 2011, pp. 297-303.

"Matrix Computations", 4th Ed., Computer Assisted Mechanics and Engineering Sciences, Johns Hopkins University Press, US, 2013, 780 pages.

Koren,"Matrix factorization techniques for recommender systems", In IEEE journal of Computer vol. 42, issue 8, Aug. 2009, pp. 42-49.

Leskovec,"Recommender Systems: Latent Factor Models", Stanford University, Jan. 28, 2015, 59 pages.

* cited by examiner

| | C1 | C2 | C3 | C4 | C5 | C6 | C7 |
|---|---|---|---|---|---|---|---|
| User 1 | 5 | ? | ? | ? | ? | 5 | ? |
| User 2 | ? | ? | ? | 3 | ? | ? | 5 |
| User 3 | ? | 2 | ? | ? | 3 | ? | ? |
| User 4 | ? | 2 | ? | ? | ? | 4 | ? |
| User 5 | 4 | ? | ? | 2 | ? | ? | 2 |
| User 6 | ? | ? | 5 | ? | 2 | ? | ? |
| User 7 | ? | 3 | ? | ? | ? | 1 | ? |
| User 8 | ? | ? | 1 | ? | ? | ? | 3 |
| User 9 | 1 | ? | ? | 5 | 5 | ? | ? |

204

| | C1 | C2 | C3 | C4 | C5 | C6 | C7 |
|---|---|---|---|---|---|---|---|
| User 1 | 5 | 1 | 5 | 1 | 1 | 5 | 5 |
| User 2 | 3 | 1 | 4 | 3 | 1 | 1 | 5 |
| User 3 | 2 | 2 | 2 | 3 | 3 | 3 | 3 |
| User 4 | 1 | 2 | 4 | 2 | 5 | 4 | 3 |
| User 5 | 4 | 5 | 3 | 2 | 2 | 2 | 2 |
| User 6 | 1 | 1 | 5 | 2 | 2 | 2 | 1 |
| User 7 | 5 | 3 | 3 | 1 | 4 | 1 | 2 |
| User 8 | 4 | 3 | 1 | 3 | 3 | 5 | 3 |
| User 9 | 1 | 2 | 5 | 5 | 5 | 1 | 2 |

|  | S1 | S2 | S3 | S4 | S5 | S6 | S7 |
|---|---|---|---|---|---|---|---|
| User 1 | ? | 4.7 | ? | ? | ? | 92.4 | ? |
| User 2 | ? | ? | 5.3 | 1.4 | ? | ? | 11.8 |
| User 3 | 72.3 | ? | ? | ? | 53.7 | ? | ? |
| User 4 | ? | 1.8 | ? | ? | ? | 81.6 | ? |
| User 5 | 48.5 | ? | ? | 15.1 | ? | ? | 20.7 |
| User 6 | ? | ? | 0.8 | ? | 66.4 | ? | ? |
| User 7 | ? | 4.7 | ? | ? | ? | 56.2 | ? |
| User 8 | ? | ? | 3.3 | ? | ? | ? | 8.3 |
| User 9 | 90.6 | ? | 4.9 | 43.3 | 28.9 | ? | ? |

304

|  | S1 | S2 | S3 | S4 | S5 | S6 | S7 |
|---|---|---|---|---|---|---|---|
| User 1 | 70.5 | 4.7 | 6.4 | 21.8 | 51.6 | 92.4 | 19.4 |
| User 2 | 57.1 | 3.8 | 5.3 | 1.4 | 63.6 | 73.9 | 11.8 |
| User 3 | 72.3 | 4.0 | 3.8 | 17.1 | 53.7 | 78.0 | 11.7 |
| User 4 | 69.6 | 1.8 | 4.9 | 20.2 | 53.7 | 81.6 | 14.7 |
| User 5 | 48.5 | 2.2 | 6.7 | 15.1 | 49.1 | 81.8 | 20.7 |
| User 6 | 76.0 | 4.8 | 0.8 | 9.5 | 66.4 | 77.8 | 9.0 |
| User 7 | 71.1 | 4.7 | 1.0 | 15.8 | 46.6 | 56.2 | 2.8 |
| User 8 | 73.7 | 4.1 | 3.3 | 18.6 | 49.6 | 70.8 | 8.3 |
| User 9 | 90.6 | 3.8 | 4.9 | 43.3 | 28.9 | 77.2 | 10.6 |

PERSONALIZED RECOMMENDATIONS USING LOCALIZED REGULARIZATION

BACKGROUND

As computing technology has advanced and computers have become more interconnected, large amounts of information has become available to users. For example, streaming movie providers may have tens of thousands of movies and television shows available for viewing, research services may have hundreds of thousands of articles available for viewing, and so forth. Given the large amount of information that is available, it can be difficult for users to identify which information they are interested in. This can result in situations in which users miss out on information that they would be interested in having but are unaware of.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, in a system to generate personalized recommendations with improved utilization of system hardware resources by using localized regularization, known values for each item in a first subset of a set of items are obtained by one or more computing devices, the known values corresponding to one of multiple users of the system. A second subset of the set of items is identified by the one or more computing devices, each item in the second subset having an unknown value. For each item in the second item subset, a value for the item based on localized regularization that is personalized to the user is generated by the one or more computing devices, and one or more actions personalized to the user are taken by the one or more computing devices based on the generated values for the items in the second item subset.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Personalized recommendations using localized regularization is discussed herein. Situations arise in which a set of items, such as products, content (e.g., audio content, video content, audio/video (A/V) content, text content), and so forth are available to numerous different users, and a distributor or other provider of such items desires to identify a subset of those items that may be desirable to the users. The set of items can include a large number of items (e.g., tens of thousands or hundreds of thousands of items). The identified subset of items for a user can then be identified, promoted, or recommended to the user in different manners.

The subset of items that may be desirable to a user are determined based in part on rankings or other feedback that the user has given to other items in the set. Given the large number of items in the set, the user has typically provided rankings or other feedback to only a small number of items in the set. For example, if the set of items includes 50,000 movies, the user may have only watched and given feedback on 50 of those movies, and a system desires to estimate ranks for the other 49,950 movies for that user (ranks that the system estimates the user would give those other 49,950 movies). The generation of these ranks is referred to as an underdetermined problem because there are more unknown values to solve for (49,950 unknown ranks in this situation) than there are equations representing the unknown values. The techniques discussed herein employ localized regularization to resolve this underdetermined problem and generate estimated values for the unknown values.

Regularization refers to adding in information into the system in order to generate the unknown values. This additional information of the system is an estimate, and is generated based on the known properties of the system. A data model is generated that reflects this additional information, as discussed in more detail below. The techniques discussed herein employ localized regularization, which refers to estimating additional information of the system based on the particular user for which the unknown values are being generated. In contrast to employing global regularization that treats all users in the system the same, the localized regularization discussed herein treats each user independently of the other users.

The techniques discussed herein allow the system to estimate what value a user would give a particular item if the user were to give the particular item a value. The system can then proceed using these estimated values, and provide recommendations to a user, take actions that are believed to be desirable by the user (e.g., promote particular movies, change which emails are provided to the user as part of an advertising campaign, etc.), and so forth. This provides increased value to the user as he or she receives information regarding items he or she is likely to be interested in and/or receives information in a manner he or she desires. This also provides increased value to the item producer or distributor because the user is more likely to read information about the item, use or watch the item, and so forth.

The techniques discussed herein further allow for improved utilization of various hardware resources in the system. For example, promotions for particular items (e.g., movies) can be communicated over a network (e.g., by electronic mail, as streaming A/V content, etc.) to only those users with estimated values for those items that exceed a threshold value, thereby reducing the number of users to which the promotions are communicated and reducing the network bandwidth used to communicate those promotions. By way of another example, storage requirements for records regarding particular promotions can be reduced due to the number of users that receive the promotions being reduced (e.g., the promotions are communicated to only those users with estimated values for the items that exceed a threshold value rather than all users). By way of yet another example, energy in users' devices can be conserved due to the users receiving promotions or recommendations for only those items for which the user has a high enough estimated value (e.g., an estimated value that exceeds a threshold value). The user thus does not waste battery power (e.g., on his or her mobile device) viewing a promotion for an item that the user is most likely not interested in due to a low estimated value for the item.

Figure 1:
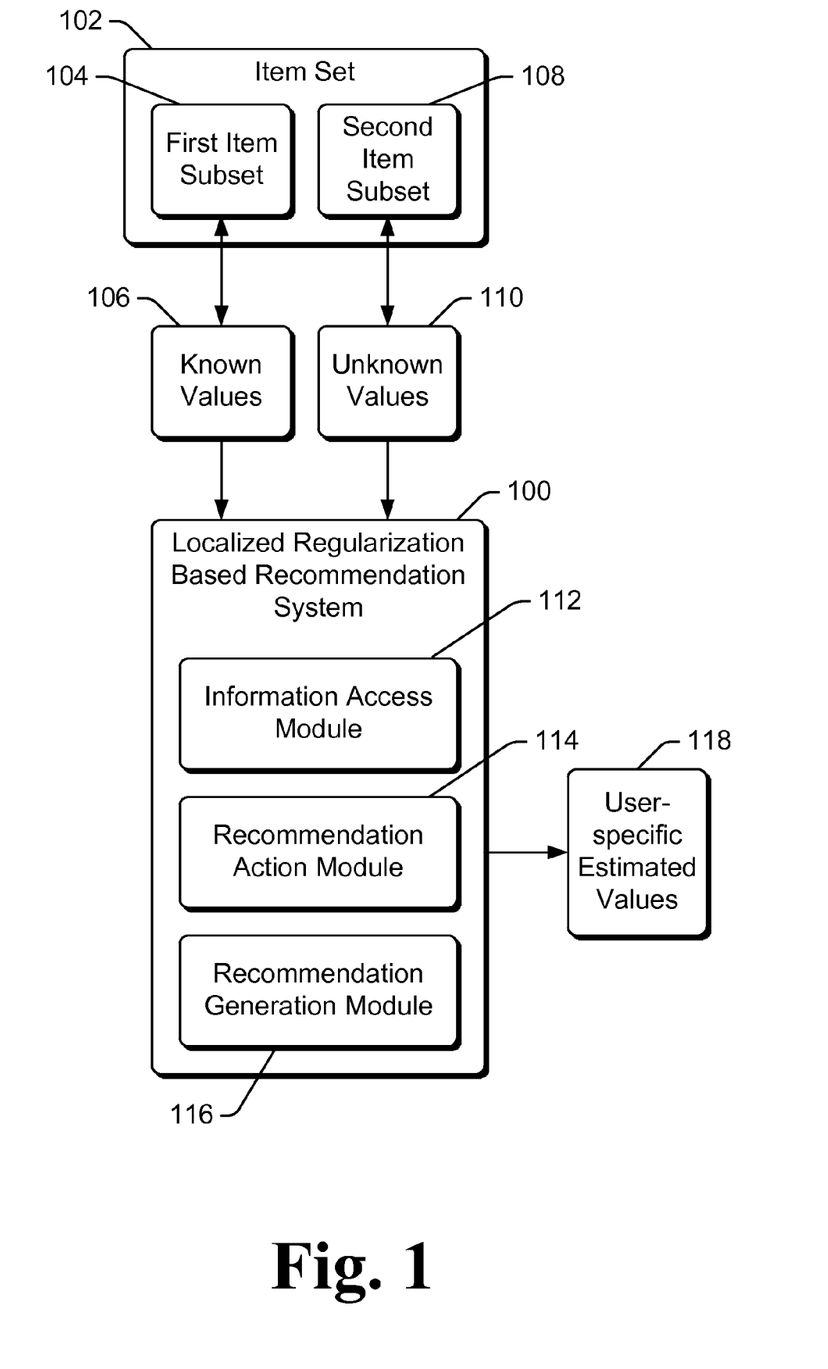
FIG. 1 is a block diagram illustrating an example system implementing the personalized recommendations using localized regularization in accordance with one or more embodiments.

FIG. 1 is a block diagram illustrating an example system 100 implementing the personalized recommendations using localized regularization in accordance with one or more embodiments. The system 100 is a localized regularization based recommendation system 100 and is implemented using one or more computing devices. Each such computing device can be a variety of different types of devices, such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Thus, such a computing device may range from a full resource device with substantial memory and processor resources (e.g., personal computers, game consoles) to a low-resource device with limited memory and/or processing resources (e.g., traditional set-top boxes, hand-held game consoles).

The localized regularization based recommendation system 100 generates recommendations for a user of items in an item set 102. Each item in the item set 102 can be a set of any of a variety of different types of objects, data, or other information. Each item in the item set 102 can also have an associated or corresponding value. A first subset 104 of the item set 102 has associated values that are known values 106. The known values 106 can be known due to a variety of operations, such as by being specified by the user of the localized regularization based recommendation system 100. A second subset 108 of the item set 102 has associated values that are unknown values 110. The unknown values 110 are unknown because, for example, they have not yet been specified by the user of the localized regularization based recommendation system 100.

For example, items can be content (e.g., audio content, video content, A/V content such as movies and television shows, articles, etc.) that is played back or otherwise consumed by users. Each such content can have an associated value that indicates rankings for the items, indicating how much a user likes the content. By way of another example, items can be products that are purchased by consumers. Each such product can have an associated value that indicates rankings for the products, indicating how much a user likes or uses the product. By way of yet another example, items can be electronic mail (email) messages that are sent to multiple users. Each such email message can have an associated value that indicates how many users opened the email message, how many links included in the message were on average selected by recipients of the email messages, and so forth. By way of yet another example, items can be Web sites. Each such Web site can have an associated value that indicates an average amount of time users spend on the Web site, an average number of links on the Web site that are selected by users, an average frequency with which the Web site is accessed, and so forth. By way of yet another example, items can be different variables of an advertising campaign. Each such variable has an associated value that indicates the conversion or purchases of users as a function of the different variables of the advertising campaign.

The localized regularization based recommendation system 100 includes an information access module 112, a recommendation action module 114, and a recommendation generation module 116. Generally, the information access module 102 obtains the known values 106 for the first item subset 104. The known values can be obtained in any of a variety of different manners, such as being retrieved from a storage device, being communicated to the information access module 112 from another device or service, and so forth. The recommendation generation module 116 generates, based at least in part on the known values 106, estimated values for the unknown values 110 for the second item subset 108. The recommendation access module 114 performs one or more actions based on the generated estimated values for the unknown values 110. In one or more embodiments, these one or more actions include generating user-specific estimated values 118.

Figure 2:
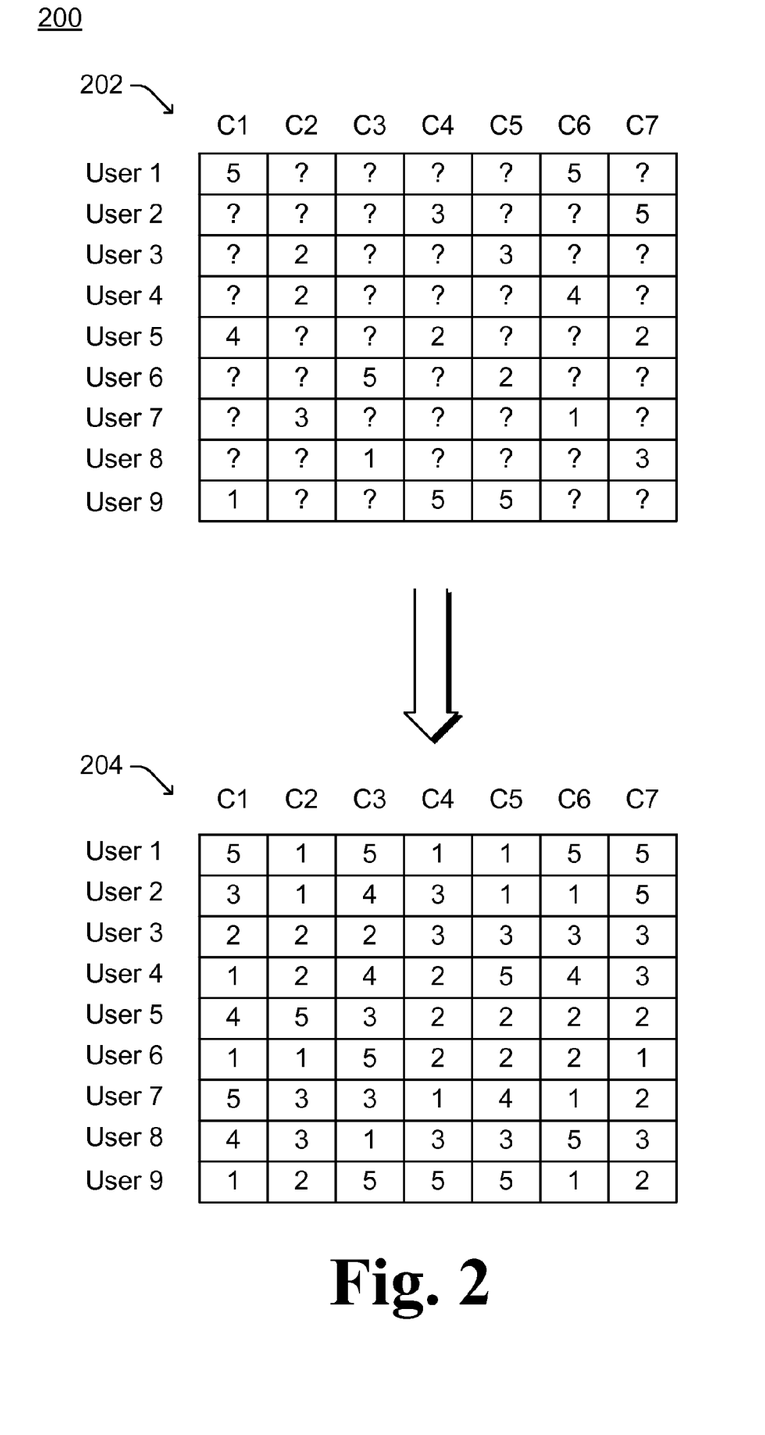
FIG. 2 illustrates an example of generating personalized recommendations using localized regularization in accordance with one or more embodiments.

FIG. 2 illustrates an example 200 of generating personalized recommendations using localized regularization in accordance with one or more embodiments. The example 200 illustrates a table 202 with multiple columns and rows. Each row of the table 202 identifies a user (shown as user 1, . . . , user 9), and each column of the table 202 identifies an item (shown as C1, . . . , C7). Although only nine users and seven items are shown in the example 200, it should be noted that there can be any number of users (e.g., tens of thousands or millions) and any number of items (e.g., tens of thousands or millions).

In the example 200, each item is content (e.g., A/V content) that can be watched by a user. The intersection of a row and column in the table 200 identifies a value for the item in that column for the user in that row. For example, user 3 has an associated value of 2 for item C2 and an associated value of 3 for item C5. The associated values are, in the illustrated example 200, rankings on a scale of 1 to 5 (e.g., with 5 being liked and 1 being disliked) indicating how much the user liked the A/V content.

As illustrated in the table 202, there are many unknown values each shown as a question mark (?). For example, the ranking of item C4 by the user 3 is unknown, presumably because the user 3 has not yet had a chance to observe or evaluate the item C4 (e.g., the item C4 is a move the user has never seen) and thus has not given a ranking to the item C4. The localized regularization based recommendation system 100 of FIG. 1 generates values for the unknown values, resulting in table 204 which has no unknown values. To generate table 204, each known value from table 202 remains the same in table 204, and each unknown value from table 202 is generated based on localized regularization that is personalized to the user. For example, localized regularization that is personalized to the user 3 is used to generate an estimated ranking for the item C4, which is a value of 3 as shown in table 204. The ranking of item C5, however, for user 3 remains 3.

Figure 3:
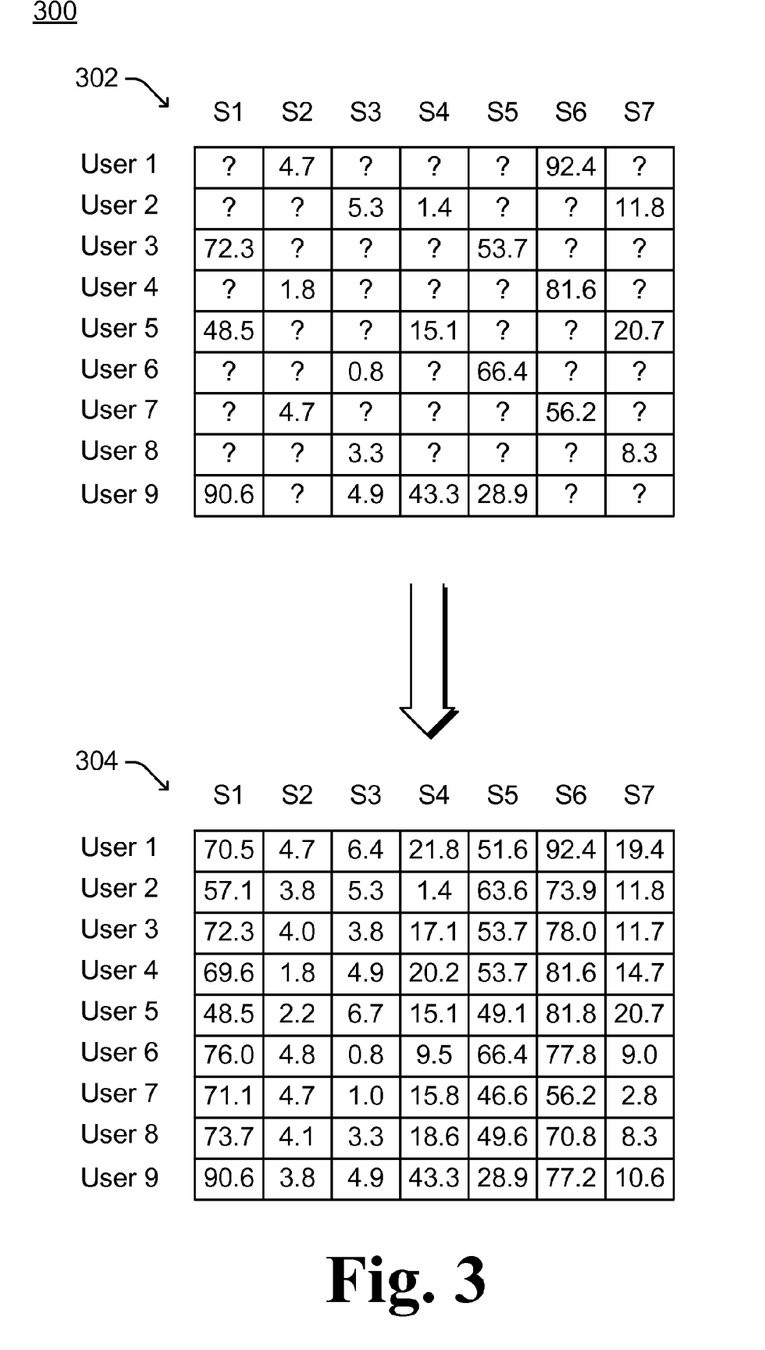
FIG. 3 illustrates another example of generating personalized recommendations using localized regularization in accordance with one or more embodiments.

FIG. 3 illustrates another example 300 of generating personalized recommendations using localized regularization in accordance with one or more embodiments. The example 300 illustrates a table 302 with multiple columns and rows. Each row of the table 302 identifies a user (shown as user 1, . . . , user 9), and each column of the table 302 identifies an item (shown as S1, . . . , S7). Although only nine users and seven items are shown in the example 300, it should be noted that there can be any number of users (e.g., tens of thousands or millions) and any number of items (e.g., tens of thousands or millions).

In the example 300, each item is a Web site (e.g., A/V content) that can be accessed by a user (e.g., using a Web browser). The intersection of a row and column in the table 300 identifies a value for the item in that column for the user in that row. For example, user 3 has an associated value of 53.7 for item S5 and user 9 has an associated value of 28.9 for item S5. The associated values are, in the illustrated example 300, an indication of an amount of time (e.g., in seconds or minutes) that a user has spent on each Web site over some given time duration (e.g., a day or a month).

As illustrated in the table 302, there are many unknown values each shown as a question mark (?). For example, the amount of time spent by the user 3 on the Web site S3 is unknown, presumably because the user 3 has not yet accessed the Web site S3 in the current time duration. The localized regularization based recommendation system 100 of FIG. 1 generates values for the unknown values, resulting in table 304 which has no unknown values. To generate table 304, each known value from table 302 remains the same in table 304, and each unknown value from table 302 is generated based on localized regularization that is personalized to the user. For example, localized regularization that is personalized to the user 3 is used to generate an estimated amount of time spent on the Web site S3, which is a value of 3.8 as shown in table 304. The amount of time spent on the Web site S1, however, for user 3 remains 72.3.

Returning to FIG. 1, the recommendation access module 114 performs one or more actions based on the generated estimated values for the unknown values 110. Various different actions can be taken by the recommendation access module 114, such as identifying, promoting, recommending, and so forth items to users in different manners. For example, an indication of the top twenty highest ranked movies (or other A/V content) for a user may be communicated to the user's computing device for presentation to the user so he or she is aware of those movies (or other A/V content). By way of another example, information describing the top 0.01% ranked items can be communicated to a distribution system so that coupons or other promotional information can be generated and provided to the user. By way of yet another example, information indicating an estimated amount of time that a user will spend on a Web site can be communicated to the servers running that Web site so that the servers can alter one or more aspects of the Web site (e.g., reduce animations, eliminate automatic audio playback, increase or decrease the number of links) in an attempt to increase the amount of time users are estimated to stay at the Web site.

The recommendation generation module 116 generates user-specific estimated values 118 for the unknown values 110 corresponding to the user as follows. A data matrix X is defined having m rows and n columns. Each row of the data matrix X corresponds to a user and each column corresponds to an item. The recommendation generation module 116 assumes that the unknown values are unknown or missing at random. This means that the probability that a data point is missing does not depend on its observed value. The recommendation generation module 116 also assumes that the data matrix (with known and unknown values) is concentrated in (lies in) a lower dimensional space or the rank of the data matrix is very small (e.g., less than a threshold difference) compared to min(m, n). Accordingly, the recommendation generation module 116 uses Singular Value Decomposition (SVD), resulting in a matrix approximation lemma.

Additionally, with respect to the sparseness of the data matrix X, the recommendation generation module 116 assumes that the following holds true:

$$a \geq C n^{1.2} r \log n$$

where r refers to the rank of data matrix X, n refers to the number of columns in the data matrix X, a refers to a number of available entries in the data matrix X (the number of unknown values in the data matrix X), and C is a positive numerical constant. The value of C is neither a negative number nor zero since C assuming a negative number or zero makes the inequality trivial. Thus, the inequality works for some positive C (i.e., there exists at least one positive value for C that the inequality is true). The typical values for C could be 0.0001, 0.001, 0.01, 1, and so forth.

Using the singular value decomposition, every m by n data matrix X can be decomposed into $$X = UDV^t$$

where U represents the left singular vectors and is an m by n orthogonal matrix such that $$UU^t = U^t U = 1$$

where V represents the right singular vectors and is an n by n orthogonal matrix such that $$VV^t = V^t V = 1$$

and where D represents a diagonal matrix with the singular vectors $$D = \text{diag}(d_1, d_2, \ldots, d_n), \text{ where } d_1 \geq d_2 \geq \ldots \geq d_n \geq 0.$$

To compute the unknown data entries in the data matrix X, the recommendation generation module 116 uses an inverse version of SVD factorization. Using the known values (the entries in the data matrix X for which values are known), the right hand side of the SVD decomposition (the singular vectors and singular values) is determined. Then, using the right hand side of the SVD decomposition, the unknown values (the missing entries in the data matrix X) are determined as follows.

The right hand side of the SVD decomposition is renamed as $R=U$ and $Q^T=DV^T$. Using the component of the matrices, the following holds true:

$$x_{ij} = r_i * q_j^T = \Sigma_{p=1}^{k} r_{ip} * q_{pj}$$

where $x_{ij}$ is the value of the entry at row i, column j of the data matrix X, $r_i$ refers to the value of the singular vectors R at row i, $q_j^T$ refers to the value of the vector $Q^T$ at column j, k refers to the rank of the data matrix X, $r_{ip}$ refers to the value of the entry at row i, column p of the singular vectors R, and $q_{pj}$ refers to the value of the entry at row p, column j of the singular vectors Q.

The reconstruction matrix for the data matrix X is thus:

$$\min_{P,Q} \sum_{i,j}^{n,p} (x_{ij} - r_i * q_j^T)^2$$

which minimizes the sum of the squared errors on the set of known values of the data matrix X. This allows the recommendation generation module 116 to learn the vectors R and Q by minimizing the sum of the squared errors between the known values in $x_{ij}$ and the learned vectors R and Q.

Due to the unknown values, the reconstruction matrix for the data matrix X is modified to include localized regularization as follows, and is referred to as the localized regularization reconstruction matrix calculation:

$$\min_{P,Q} \sum_{i,j}^{n,p} (x_{ij} - r_i * q_j^T)^2 + \left( \sum_{i=1}^{n} \lambda_i \|r_i\|^2 + \lambda_2 \sum_{j=1}^{n} \|q_j\|^2 \right) \qquad \text{eq. (1)}$$

where $x_{ij}$ is the value of the entry at row i, column j of the data matrix X, $r_i$ refers to the value of the singular vectors R at row i, $q_j$ refers to the value of the singular vectors Q at column j, $q_j^T$ refers to the value of the vector $Q^T$ at column j, k refers to the rank of the data matrix X, $r_{ip}$ refers to the value of the entry at row i, column p of the singular vectors R, and $q_{pj}$ refers to the value of the entry at row p, column j of the singular vectors Q, $\lambda_i$ refers to a localized regularization constant for the user, and $\lambda_2$ refers to a regularization constant for the items.

The implementation of using the localized regularization reconstruction matrix calculation to generate the unknown values is based on stochastic gradient descent (SGD) where all of the values of λ are fixed except for $\lambda_i$ (the value of λ for a particular user corresponding to row i of the data matrix X). The values of $\lambda_i$ are updated using cross-correlation, with the calculation of the localized regularization reconstruction matrix being repeated until the value of each $\lambda_i$ is optimized, also referred to as the values of all of the λ's converging.

More generally, the localized regularization reconstruction matrix calculation creates a data model that reflects estimated values for unknown values 110 for the user for a particular item given the known values 106 for the user for other items. A model that describes the value assigned to a particular item for a user is represented by the singular vectors R, the singular vectors Q, the localized regularization constant for the user $\lambda_i$, and the regularization constant for the items $\lambda_2$. The first part of the localized regularization reconstruction matrix calculation, $(x_{ij} - r_i * q_j^T)^2$, reflects the similarity of the data model to the known values 106, and its inclusion in the localized regularization reconstruction matrix calculation indicates that the difference between the values estimated by the data model and the actual known values is to be reduced (e.g., minimized). The first part of the localized regularization reconstruction matrix calculation is directed to reconstruction error—the data model is determined so that it reconstructs the known values of the system (the known values in data matrix X) correctly (or within a threshold amount of the known values).

The second part of the localized regularization reconstruction matrix calculation, $(\Sigma_{i=1}^{n} \lambda_i \|r_i\|^2 + \lambda_2 \Sigma_{j=1}^{n} \|q_j\|^2)$, reflects the additional information that is added in, which is provided by the data model. The inclusion of the second part of the localized regularization reconstruction matrix calculation indicates that the difference between the values estimated by the data model (when added with the differences between the values estimated by the data model and the actual known values) is to be reduced (e.g., minimized).

Initial values of the singular vectors R and the singular vectors Q can be set in a variety of different manners. For example, values that are within a typical range for the unknown values can be randomly selected, values that are the same as the known values can be selected, and so forth. The localized regularization reconstruction matrix calculation is repeated with the data model being updated (i.e., values for the singular vectors R and the singular vectors Q increased or decreased) on each iteration until the calculated value in the localized regularization reconstruction matrix calculation (eq. (1)) is minimized. Although referred to herein as minimized, alternatively an absolute minimum may not be found. For example, the minimum may be determined as having been found if the difference between a current calculation and the previous calculation is less than a threshold amount.

The localized regularization constant for the user $\lambda_i$, can be determined in a variety of different manners. In one or more embodiments, the value $\lambda_i$ is determined using cross-validation. An initial value of $\lambda_i$ is selected in various manners, such as randomly or according to other rules or criteria. One or more of the known values 106 for the user are treated as unknown values 110, and are referred to herein as reserved values. After generating the data model with an initial value of $\lambda_i$, the data model is used to predict these reserved values. The value of $\lambda_i$ is modified as appropriate (i.e., increased or decreased) until the values generated for the reserved values by the data model are the same as the reserved values (or within a threshold amount of the reserved values).

The initial value of the regularization constant for the items $\lambda_2$ can, similar to the value of $\lambda_i$, be set in a variety of different manners and updated analogous to the value $\lambda_i$. Alternatively, the value of the regularization constant for the items $\lambda_2$ can be set in other manners, such as being a constant set by a developer or user of the localized regularization based recommendation system 100.

It should be noted that, after modifying the value of $\lambda_i$ (and possibly $\lambda_2$ as well), the localized regularization reconstruction matrix calculation can be repeated, resulting in different values for the singular vectors R and the singular vectors Q. This process of changing the values of the singular vectors R and the singular vectors Q and the localized regularization constant for the user $\lambda_i$ can be repeated until the values converge (e.g., the change to the values of the singular vectors R and the singular vectors Q after calculating the localized regularization constant for the user $\lambda_i$ is zero or less than a threshold amount).

Figure 4:
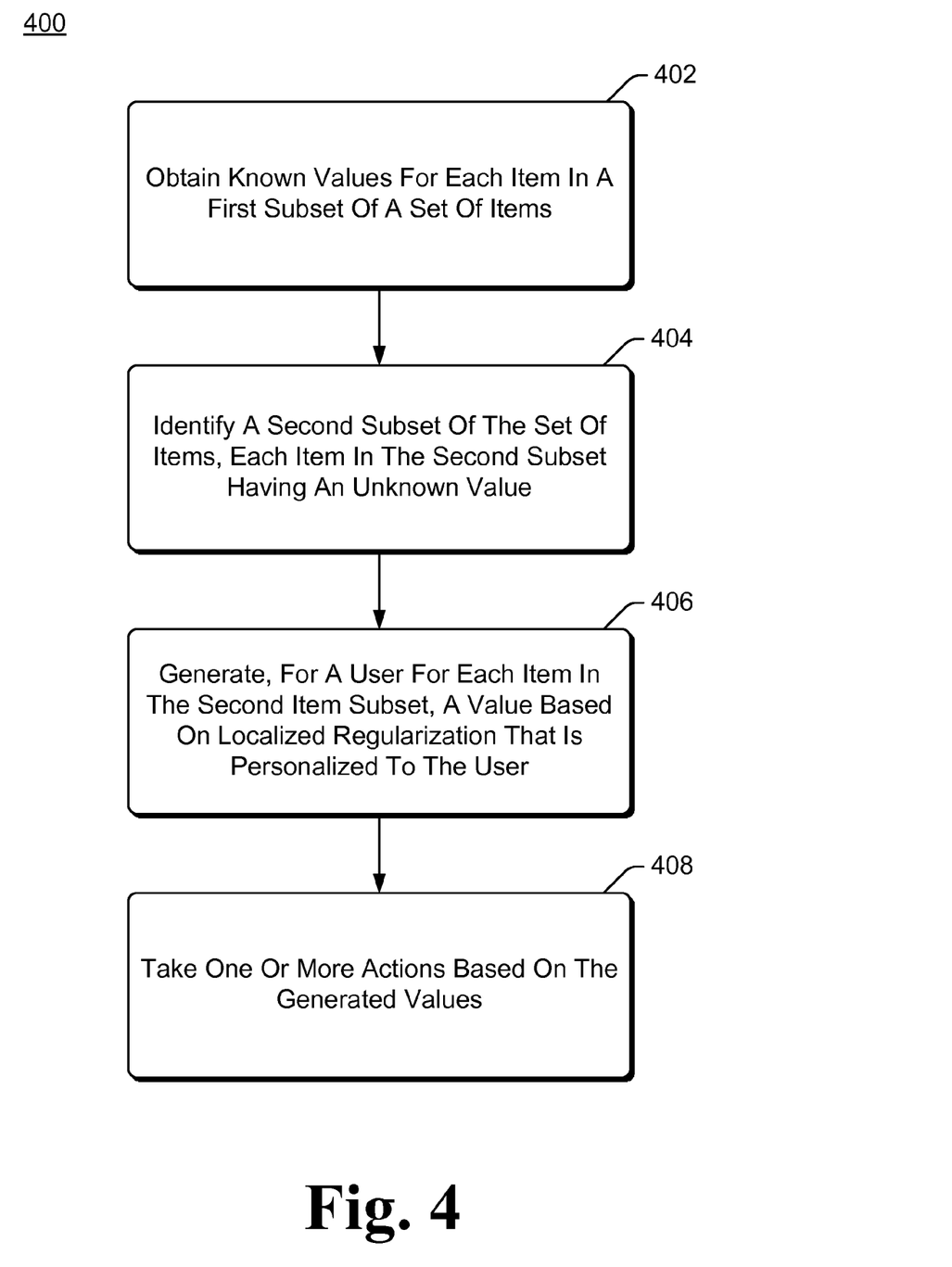
FIG. 4 is a flowchart illustrating an example process for implementing personalized recommendations using localized regularization in accordance with one or more embodiments.

FIG. 4 is a flowchart illustrating an example process 400 for implementing personalized recommendations using localized regularization in accordance with one or more embodiments. Process 400 is carried out by a localized regularization based recommendation system, such as localized regularization based recommendation system 100 of FIG. 1, and can be implemented in software, firmware, hardware, or combinations thereof. Process 400 is shown as a set of acts and is not limited to the order shown for performing the operations of the various acts. Each of the acts in process 400 can be performed automatically and without user intervention. Process 400 is an example process for implementing personalized recommendations using localized regularization; additional discussions of implementing personalized recommendations using localized regularization are included herein with reference to different figures.

In process 400, known values for each item in a first subset of a set of items is obtained (act 402). Any of a variety of different values for any of a variety of different items can be obtained as discussed above.

A second subset of the set of items is identified, each item in the second subset having an unknown value (act 404). The items in the second subset can have unknown values for a variety of different reasons as discussed above, such as the user not having set a value yet for the item.

For each item in the second item subset, a value is generated for a user based on localized regularization that is personalized to the user (act 406). These values are estimates of what the user is expected (by the localized regularization based recommendation system) to have set for the items in the second item subset. The process of generating the values for the second item subset for different users is customized or personalized to each individual user.

One or more actions are taken based on the generated values for the user (act 408). Various different actions can be taken as discussed above, such as identifying, promoting, recommending, and so forth items to users in different manners. These actions, due at least in part to their being based on values generated that are personalized to the user as discussed in act 406, are also personalized to the user.

Figure 5:
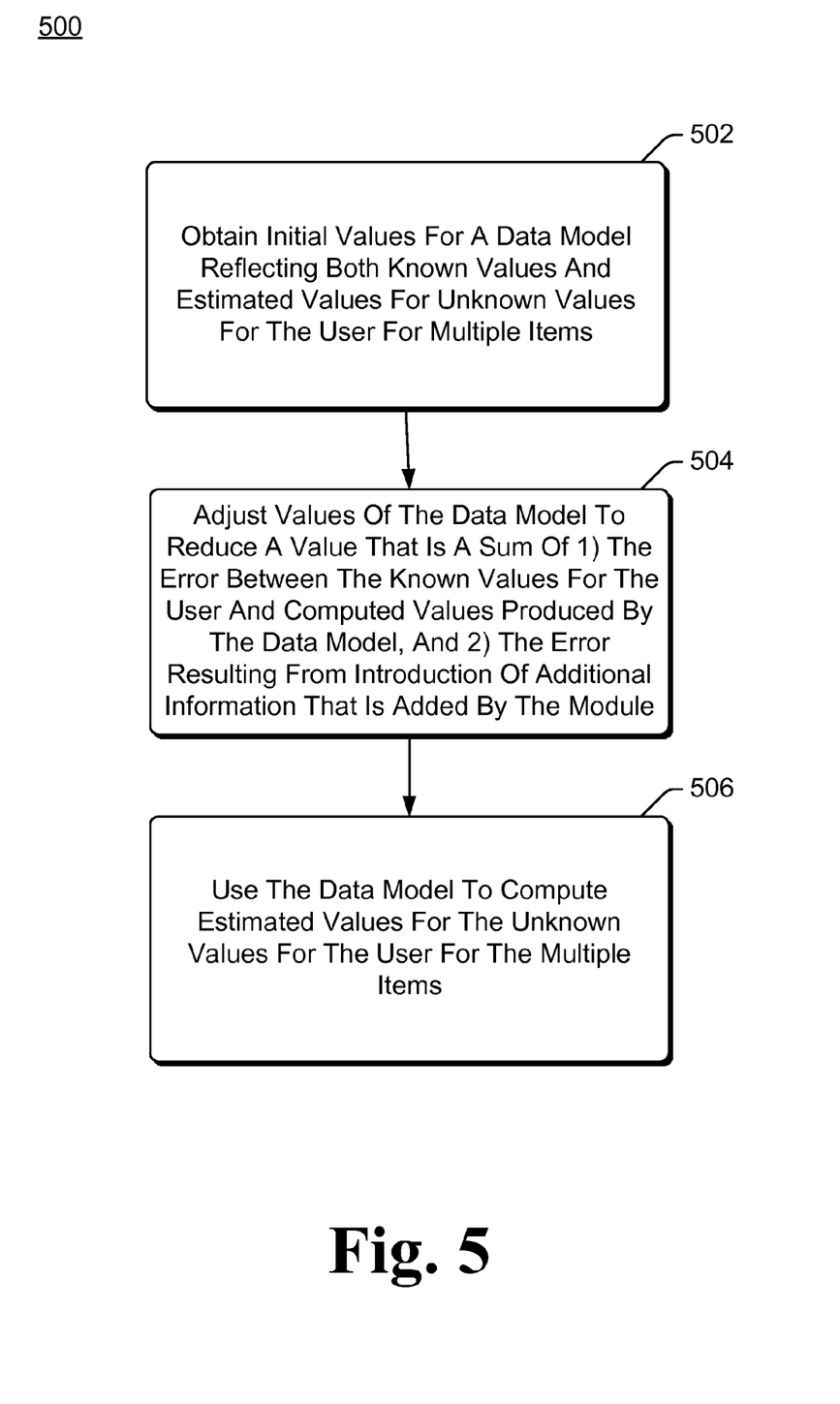
FIG. 5 is a flowchart illustrating an example process for generating estimates of unknown values for a user in accordance with one or more embodiments.

FIG. 5 is a flowchart illustrating an example process 500 for generating estimates of unknown values for a user in accordance with one or more embodiments. Process 500 is carried out by a localized regularization based recommendation system, such as localized regularization based recommendation system 100 of FIG. 1, and can be implemented in software, firmware, hardware, or combinations thereof. Process 500 can implement, for example, act 406 of FIG. 4. Process 500 is shown as a set of acts and is not limited to the order shown for performing the operations of the various acts. Each of the acts in process 500 can be performed automatically and without user intervention. Process 500 is an example process for generating estimates of unknown values for a user; additional discussions of implementing personalized recommendations using localized regularization are included herein with reference to different figures.

In process 500, initial values for a data model reflecting both known values and estimated values for unknown values for the user for multiple items are obtained (act 502). The data model in act 502 is a data model that describes the value assigned to a particular item for a user and is represented by the singular vectors R, the singular vectors Q, the localized regularization constant for the user $\lambda_i$, and the regularization constant for the items $\lambda_2$ as discussed above. Initial values for the data model can be set in different manners, as discussed above.

Values of the data model are adjusted (act 504). The values are adjusted to reduce (e.g., minimize) a value that is a sum of 1) the error between the known values for the user and computed values produced by the data model, and 2) the error resulting from introduction of additional information that is added by the module. The values are adjusted by being increased or decreased until the values converge (e.g., the change to the values of the singular vectors R and the singular vectors Q after calculating the localized regularization constant for the user $\lambda_i$ and possibly $\lambda_2$ as well is zero or less than a threshold amount).

Use the data model to compute estimated values for the unknown values for the user for the multiple items (act 506). The data model is used to compute the estimated values for the unknown values for the user after the values of the data model have been adjusted to reduce the sum in act 504. The unknown values for the user (the unknown values for the row of the data matrix X that includes values for the user) can be readily generated given the values of the singular vectors R and the singular vectors Q due to the following holding true:

$$x_{ij}=r_i{}^*q_j{}^T=\Sigma_{p=1}^{k}r_{ip}{}^*q_{pj}$$

as discussed above.

It should be noted that, because the data model uses local regularization that is personalized to the user, the process 500 generates estimated values for the unknown values for one user for the multiple items. The process 500 is repeated for each user, rather than being performed a single time to generate estimated values for the unknown values for multiple users.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Additionally, although particular functionality is discussed herein with reference to particular modules, it should be noted that the functionality of individual modules discussed herein can be separated into multiple modules, and/or at least some functionality of multiple modules can be combined into a single module.

Figure 6:
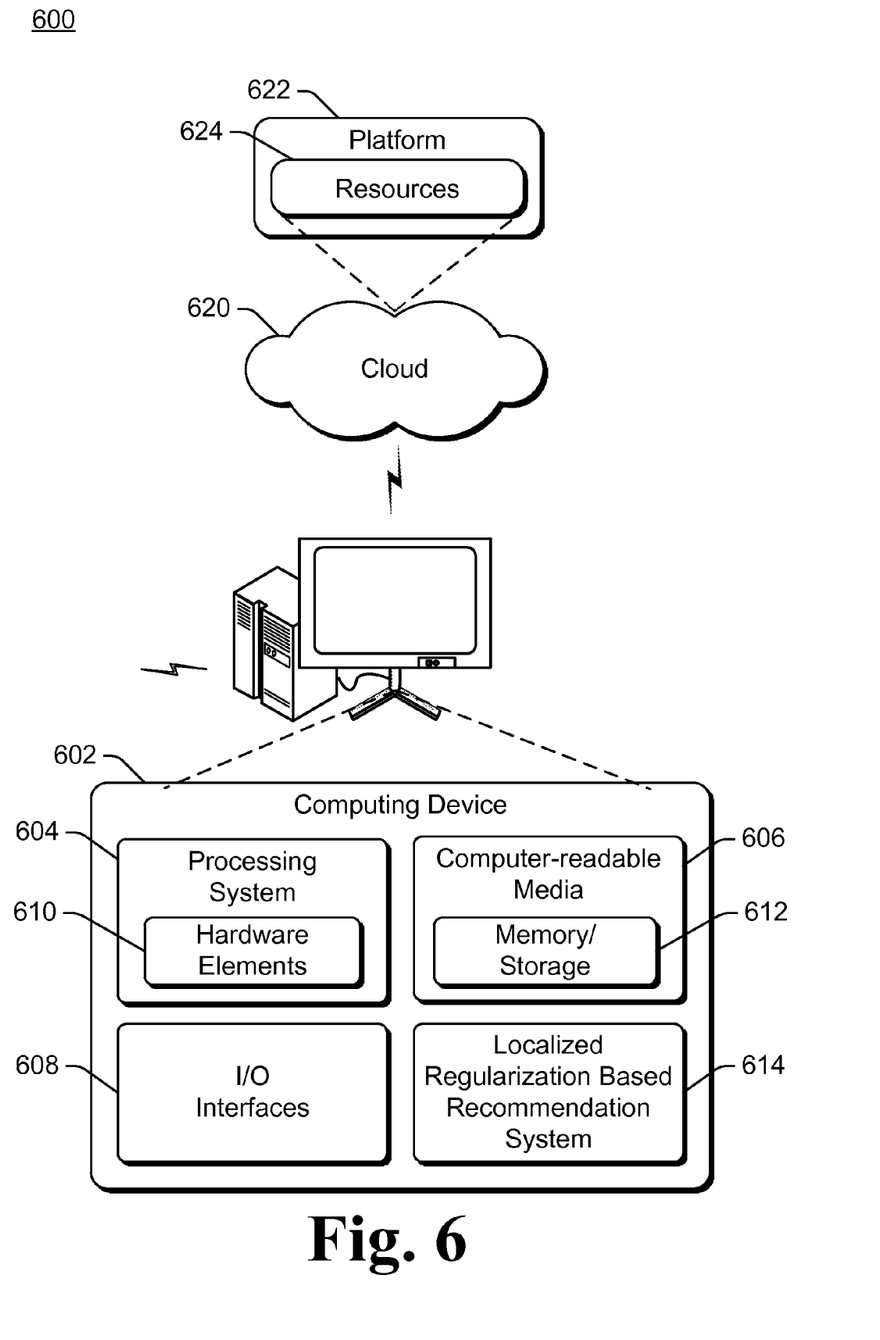
FIG. 6 illustrates an example system that includes an example computing device that is representative of one or more computing systems and/or devices that may implement the various techniques described herein.

FIG. 6 illustrates an example system generally at 600 that includes an example computing device 602 that is representative of one or more computing systems and/or devices that may implement the various techniques described herein. This is illustrated through inclusion of the localized regularization based recommendation system 614, which may be configured to generate personalized recommendations as discussed herein, and which may be the localized regularization based recommendation system 100 of FIG. 1. Computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 604 is representative of functionality to perform one or more operations using hardware. Accordingly, processing system 604 is illustrated as including hardware elements 610 that may be configured as processors, functional blocks, and so forth. This may include implementation in hardware as an application specific integrated circuit or other logic device formed using one or more semiconductors. Hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 606 is illustrated as including memory/storage 612. Memory/storage 612 represents memory/storage capacity associated with one or more computer-readable media. Memory/storage component 612 may include volatile media (such as random access memory (RAM)) and/or nonvolatile media (such as read only memory (ROM), Flash memory, optical disks, magnetic disks, and so forth). Memory/storage component 612 may include fixed media (e.g., RAM, ROM, a fixed hard drive, and so on) as well as removable media (e.g., Flash memory, a removable hard drive, an optical disc, and so forth). Computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 602. By way of example, and not limitation, computer-readable media may include "computer-readable storage media" and "computer-readable signal media."

"Computer-readable storage media" refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. Computing device 602 may be configured to implement particular instructions and/or functions corresponding to the software and/or hardware modules. Accordingly, implementation of a module that is executable by computing device 602 as software may be achieved at least partially in hardware, e.g., through use of computer-readable storage media and/or hardware elements 610 of processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of computing device 602 and are not limited to the specific examples of the techniques described herein. This functionality may also be implemented all or in part through use of a distributed system, such as over a "cloud" 620 via a platform 622 as described below.

Cloud 620 includes and/or is representative of a platform 622 for resources 624. Platform 622 abstracts underlying functionality of hardware (e.g., servers) and software resources of cloud 620. Resources 624 may include applications and/or data that can be utilized while computer processing is executed on servers that are remote from computing device 602. Resources 624 can also include services provided over the Internet and/or through a subscriber network, such as a cellular or Wi-Fi network.

Platform 622 may abstract resources and functions to connect computing device 602 with other computing devices. Platform 622 may also serve to abstract scaling of resources to provide a corresponding level of scale to encountered demand for resources 624 that are implemented via platform 622. Accordingly, in an interconnected device embodiment, implementation of functionality described herein may be distributed throughout system 600. For example, the functionality may be implemented in part on computing device 602 as well as via platform 622 that abstracts the functionality of the cloud 620.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. In a system to generate personalized recommendations with improved utilization of system hardware resources by using localized regularization, a method implemented by one or more computing devices, the method comprising:
   obtaining, by the one or more computing devices, known values for each item in a first subset of a set of items, the known values corresponding to one of multiple users of the system;
   identifying, by the one or more computing devices, a second subset of the set of items, each item in the second subset having an unknown value;
   generating, by the one or more computing devices for each item in the second item subset, a value for the item based on localized regularization that is personalized to the user individually from the multiple users, the generating including reducing an error between values of one or more of the first subset of items and computed values produced by a data model representing the values of the set of items by reducing a value that is a sum of:
      the error between values of the one or more of the first subset of items and computed values produced by the data model representing the values of the set of items, and
      the error resulting from introduction of additional information that is added by the data model; and
   taking, by the one or more computing devices based on the generated values for the items in the second item subset, one or more actions personalized to the user.

2. The method as recited in claim 1, the values comprising user rankings for the items.

3. The method as recited in claim 1, the reducing the error comprising minimizing the error.

4. The method as recited in claim 1, the reducing the error comprising minimizing the error.

5. The method as recited in claim 1, the generating further including treating at least one of the known values as an unknown value, and adjusting a value of a localized regularization constant for the user so that the data model generates the at least one known value for the user.

6. The method as recited in claim 1, wherein the one or more actions personalized to the user include identifying at least one said item to the user.

7. The method as recited in claim 1, wherein the one or more actions personalized to the user include recommending at least one said item to the user.

8. The method as recited in claim 1, wherein the one or more actions personalized to the user include providing promotional information to the user.

9. A system, implemented in one or more computing devices, to generate personalized recommendations with improved utilization of hardware resources of the system by using localized regularization, the system comprising:
   an information access module configured to obtain known values for each item in a first item subset, the first item subset being a subset of a set of items, the known values corresponding to one of multiple users of the system;
   a recommendation generation module configured to:
      identify automatically and without user intervention a second item subset, the second item subset being a subset of the set of items, each item in the subset having an unknown value;
      generate, for each item in the second item subset, a value for the item based on localized regularization that is personalized to the user individually from the multiple users, the generation including reducing an error between values of one or more of the first subset of items and computed values produced by a data model representing the values of the set of items by reducing a value that is a sum of:
         the error between values of the one or more of the first subset of items and computed values produced by the data model representing the values of the set of items, and
         the error resulting from introduction of additional information that is added by the data model; and
   a recommendation action module configured to take, based on the generated values for the items in the second item subset, one or more actions personalized to the user.

10. The system as recited in claim 9, the values comprising user rankings for the items.

11. The method as recited in claim 9, the reducing the error comprising minimizing the error.

12. The system as recited in claim 9, the reducing the error comprising minimizing the error.

13. The system as recited in claim 9, the recommendation generation module being further configured to generate the values for the items in the second item subset by treating at least one of the known values as an unknown value, and adjusting a value of a localized regularization constant for the user so that the data model generates the at least one known value for the user.

14. The system as recited in claim 9, wherein the one or more actions personalized to the user include identifying at least one said item to the user.

15. The system as recited in claim 9, wherein the one or more actions personalized to the user include recommending at least one said item to the user.

16. The system as recited in claim 9, wherein the one or more actions personalized to the user include providing promotional information to the user.

17. In a system to generate personalized recommendations with improved utilization of system hardware resources by using localized regularization, a computing device comprising:
   one or more processors; and
   computer-readable storage medium having stored thereon multiple instructions that implement an information access module and a recommendation generation module and that, responsive to execution by the one or more processors, cause the one or more processors to perform acts comprising:

obtaining, by the information access module, known values for each item in a first subset of a set of items, the known values corresponding to one of multiple users of the system; and communicating the known values to the recommendation generation module, the recommendation generation module automatically and without user intervention;

identifying a second subset of the set of items, each item in the second subset having an unknown value, and generating, for each item in the second item subset, a value for the item based on localized regularization that is personalized to the user individually from the multiple users, the generating including reducing an error between values of one or more of the first subset of items and computed values produced by a data model representing the values of the set of items by reducing a value that is a sum of:

the error between values of the one or more of the first subset of items and computed values produced by the data model representing the values of the set of items, and the error resulting from introduction of additional information that is added by the data model.

18. The computing device as recited in claim 17, the values comprising user rankings for the items.

19. The computing device as recited in claim 17, the reducing the error comprising minimizing the error.

20. The computing device as recited in claim 17, the generating further including treating at least one of the known values as an unknown value, and adjusting a value of a localized regularization constant for the user so that the data model generates the at least one known value for the user.

* * * * *

UNITED STATES PATENT AND TRADEMARK OFFICE
CERTIFICATE OF CORRECTION

PATENT NO. : 10,152,545 B2
APPLICATION NO. : 14/918261
DATED : December 11, 2018
INVENTOR(S) : Kourosh Modarresi

Page 1 of 1

It is certified that error appears in the above-identified patent and that said Letters Patent is hereby corrected as shown below:

In the Claims

Column 14, Line 35, delete "method", insert -- system --, therefor.

Signed and Sealed this
Ninth Day of April, 2019

Andrei Iancu
*Director of the United States Patent and Trademark Office*